April 30, 1929.  H. W. BAKER  1,710,855
TRANSMISSION
Filed May 19, 1927    2 Sheets-Sheet 1
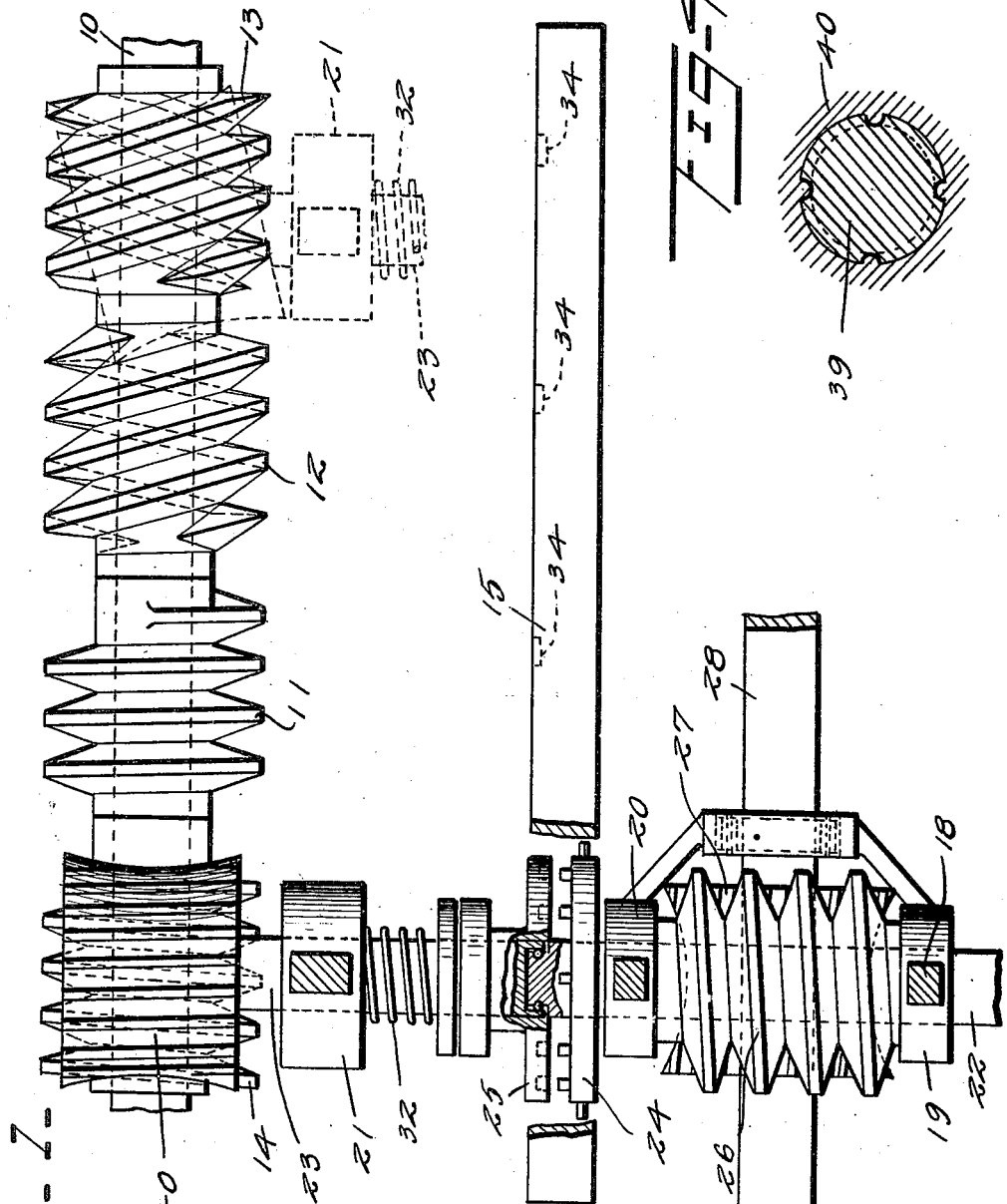
Inventor
H. W. Baker
By 
Attorney

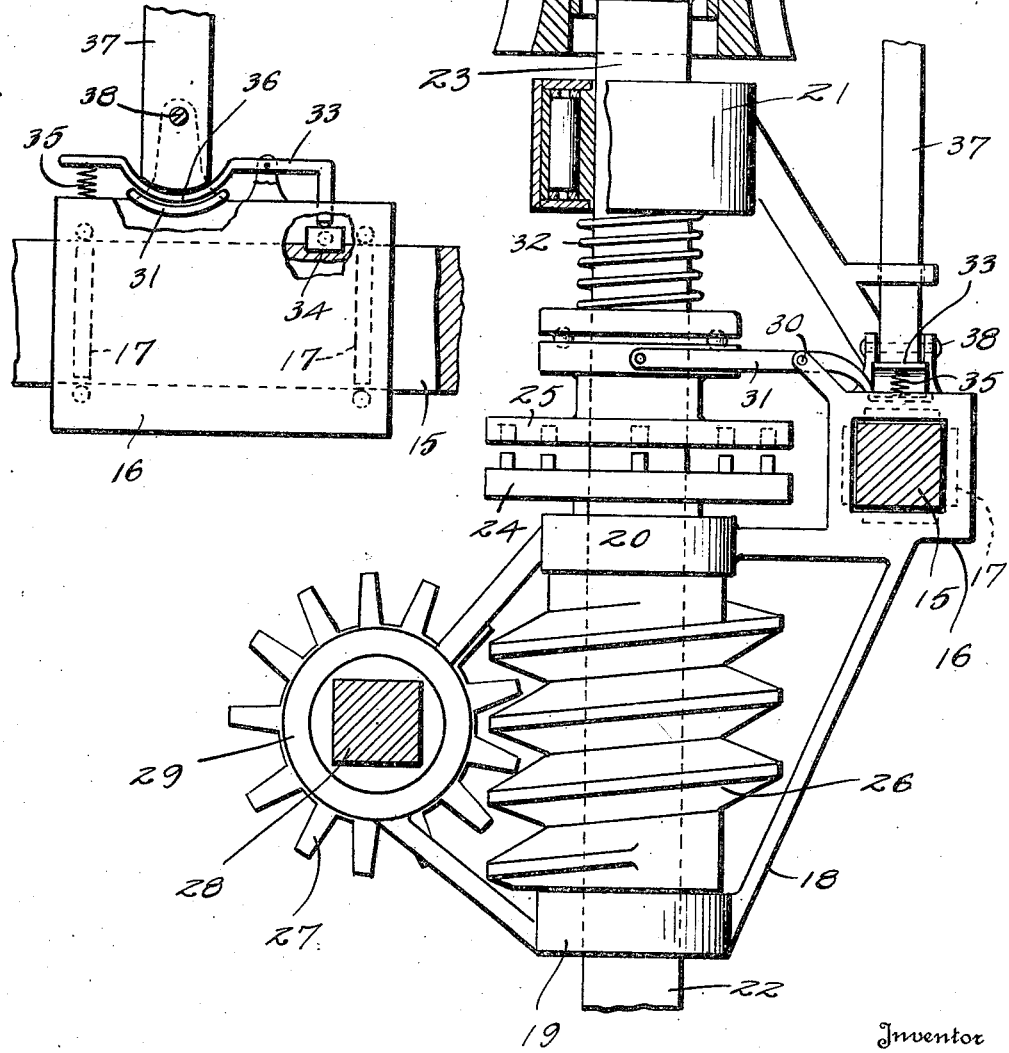

Patented Apr. 30, 1929.

1,710,855

UNITED STATES PATENT OFFICE.

HENRY W. BAKER, OF MONTEVIDEO, MINNESOTA.

TRANSMISSION.

Application filed May 19, 1927. Serial No. 192,689.

This invention relates to transmissions and more particularly to change speed gearing, especially adapted for use in connection with automobiles, which employs a worm drive throughout.

An important object of the invention is to provide a construction such that all of the elements of the drive or input shaft of the transmission may be mounted solidly upon this shaft and a single gear employed to transmit the drive therefrom and interchangeably engaged therewith.

A further object of the invention is to provide a device of this character so constructed that a "straight through" movement is provided from reverse to high gear.

These and other objects I attain by the construction shown in the accompanying drawings, wherein for the purpose of illustration is shown a preferred embodiment of my invention and wherein:—

Figure 1 is a side elevation partially broken away of a transmission constructed in accordance with my invention;

Figure 2 is a vertical sectional view therethrough, portions being broken away to illustrate the construction;

Figure 3 is a side elevation partially broken away of the yoke and the control lever carried thereby;

Figure 4 is a section on the line 4—4 of Figure 2.

Referring now more particularly to the drawings, the numeral 10 generally designates the input shaft of a transmission to which, in accordance with my invention, are secured worms 11, 12 and 13, which are correspondingly pitched, but at varying angles and a further worm 14, which is oppositely pitched to worms 11, 12 and 13 and constitutes a reverse drive gear. The gears 12 and 13 are multiple-threaded.

Paralleling the shaft 10 is a bar 15 upon which is slidably mounted a yoke 16 provided with suitable bearings 17 for engagement with the bar. This yoke is provided with arms 18 having spaced bearings 19, 20 and 21, of which the bearings 19 and 20 are single roller bearings supporting a shaft 22 and the bearing 21 is a double roller bearing supporting a shaft 23. Adjacent ends of the shafts 22 and 23 are rotatably engaged and have mounted thereon fixed and movable elements 24 and 25 of a clutch. The movable element 25 is splined to the shaft 23, while the stationary element 24 is secured to the shaft 22. Between the bearings 19 and 20, the shaft 22 has secured thereto a worm 26 meshing with a worm gear 27 splined upon an output shaft 28, which parallels the shaft 10. The outer ends of the arms 18 which are provided with bearings 19 and 20 converge to provide a bearing support 29 for the shaft.

The yoke 16 has pivoted thereto at 30 the shifting lever 31 for the movable clutch element 25, which is normally engaged with the fixed clutch element by a spring 32 surrounding the shaft section 23. Likewise pivoted to the yoke is a second lever 33 extending transversely of the first named lever and having an end thereof adapted for engagement in notches 34 under the influence of a spring 35. This lever is provided with a flexure 36, for the reception of the end of a pivoted operating handle 37 and beneath this flexure, the end of the lever 31 extends. By rotating the operating lever 37 about its pivot 38, the lever 33 is shifted against the action of the spring 35 to disengage it from an engaged notch 34 and thus permit movement of the yoke and the lever 31 is actuated to disengage the sections of the clutch.

The outer end of the shaft section 23 is provided with a spherical head 39, with which a worm gear 40 is so engaged as to permit limited oscillation thereof, while preventing relative rotation. The amount of oscillation of the gear 40 which must be provided is determined by the difference in pitch between the worms 11 and 13, it being understood that the worm 14 will be of substantially the same angularity as the worm 11, but oppositely pitched thereto. It will be obvious that if the handle lever 37 is shifted to disengage the lever 33 from the bar 15 and to disengage the sections of the clutch, the entire unit represented by the yoke, shaft sections 22 and 23 and their associated mechanism may be moved as a unit longitudinally of the bar 15 to register the gear 40 with any of the worms 11 to 14. When the proper alignment with the selected gear is had, a recess 34 is aligned with the end of the lever 33 and this lever may enter the notch. Until this lever does enter the notch, the clutch sections are maintained disengaged, so that no drive may take place until all parts are in their proper alignment.

It will be obvious that with a structure of this character, a very quiet drive may be obtained and a transmission may be produced, which may be much more readily assembled and more cheaply manufactured than the ordinary transmission now in use in automobiles.

It will also be obvious that the construction hereinbefore set forth is capable of a certain range of change and modification without materially departing from the spirit of the invention and I accordingly do not limit myself to such specific structure except as hereinafter claimed.

I claim:—

1. In transmission mechanism, a drive shaft having a plurality of longitudinally spaced worms of different pitches, a bar paralleling said shaft, a yoke slidable on said bar, a shaft supported from the yoke and having a worm gear mounted thereon for selective engagement with the worms of the shaft, means for securing the yoke in adjusted positions upon the bar, an output shaft, a driving connection between the last named shaft and the output shaft including a clutch and means for releasing the securing means of the yoke and means for disengaging said clutch.

2. In transmission mechanism, a drive shaft having a plurality of longitudinally spaced worms of different pitches, a bar paralleling said shaft, a yoke slidable on said bar, a shaft supported from the yoke and having a worm gear mounted thereon for selective engagement with the worms of the shaft, means for securing the yoke in adjusted positions upon the bar, an output shaft, a driving connection between the last named shaft and the output shaft including a clutch, and means for simultaneously disengaging the clutch and releasing the securing means of the yoke.

3. In transmission mechanism, a drive shaft having a plurality of longitudinally spaced worms of different pitches, a bar paralleling said shaft, a yoke slidable on said bar, a shaft supported from the yoke, and having a worm gear mounted thereon for selective engagement with the worms of the shaft, a pivoted latch lever carried by the yoke and engageable in notches formed in said bar when the yoke is positioned to properly align the worm gear with one of said worms and an output shaft having driving connection with the last named shaft in all positions of the yoke, the driving connection including a clutch.

4. In transmission mechanism, a drive shaft having a plurality of longitudinally spaced worms of different pitches, a bar paralleling said shaft, a yoke slidable on said bar, a shaft supported from the yoke and having a worm gear mounted thereon for selective engagement with the worms of the shaft, a pivoted latch lever carried by the yoke and engageable in notches formed in said bar when the yoke is positioned to properly align the worm gear with one of said worms and an output shaft having driving connection with the last named shaft in all positions of the yoke, the driving connection including a clutch and means operated by disengagement of the latch lever from a notch of the bar releasing the clutch.

5. In transmission mechanism, a drive shaft having a plurality of longitudinally spaced worms of different pitches, a bar paralleling said shaft, a yoke slidable on said bar, a pair of aligned shaft sections supported from the yoke and bearing coacting fixed and movable sections of a clutch, one of said shaft sections having a worm gear mounted thereon for selective engagement with the worms of the shaft, the other of said shaft sections having permanent driving connection with an output shaft and means for locking the yoke in adjusted positions upon the bar wherein the gear is properly aligned with a selected worm of the drive shaft.

6. In transmission mechanism, a drive shaft having a plurality of longitudinally spaced worms of different pitches, a bar paralleling said shaft, a yoke slidable on said bar, a pair of aligned shaft sections supported from the yoke and bearing coacting fixed and movable sections of a clutch, one of said shaft sections having a worm gear mounted thereon for selective engagement with the worms of the shaft, the other of said shaft sections having permanent driving connection with an output shaft, means for locking the yoke in adjusted positions upon the bar wherein the gear is properly aligned with a selected worm of the drive shaft, including a pivoted latch lever having one end thereof adapted for engagement in notches formed in said bar and means operated by movement of the latch lever to disengage said end from a notch of the bar to disengage the sections of the clutch.

7. In transmission mechanism, a drive shaft having a plurality of longitudinally spaced worms of different pitches, a bar paralleling said shaft, a yoke slidable on said bar, a pair of aligned shaft sections supported from the yoke and bearing coacting fixed and movable sections of a clutch, one of said shaft sections having a worm gear mounted thereon for selective engagement with the worms of the shaft, the other of said shaft sections having permanent driving connection with an output shaft, means for locking the yoke in adjusted positions upon the bar wherein the gear is properly aligned with a selected worm of the drive shaft including a pivoted latch lever having one end thereof adapted for engagement in notches formed in said bar, and a shifting fork for said clutch having its end positioned adjacent the opposite end of the latch lever to be engaged thereby upon operation of the latch lever to disengage the first named end thereof from a notch of the shaft whereby disengagement of the first named end of the latch lever is accompanied by a disengagement of the sections of the clutch.

In testimony whereof I hereunto affix my signature.

HENRY W. BAKER.